United States Patent [19]
Pratt

[11] 3,976,378
[45] Aug. 24, 1976

[54] APPARATUS FOR MONITORING THE SELECTION OF CHART RECORDING AND WAVELENGTH SCANNING SPEEDS IN A RADIANT ENERGY ANALYZER

[76] Inventor: Stanley L. Pratt, 5331 Walter St., Riverside, Calif. 92504

[22] Filed: Nov. 11, 1974

[21] Appl. No.: 522,648

[52] U.S. Cl. .............................. 356/96; 346/33 A; 356/89; 356/95
[51] Int. Cl.[2] .......................................... G01J 3/42
[58] Field of Search ................... 356/89, 96, 97, 93, 356/94, 95, 74; 346/74 A, 33 A

[56] References Cited
UNITED STATES PATENTS

| | | | |
|---|---|---|---|
| 2,656,468 | 10/1953 | Schlesman | 356/96 X |
| 3,063,043 | 11/1962 | Coates | 356/89 X |
| 3,486,823 | 12/1969 | Matthews | 356/89 |
| 3,545,865 | 12/1970 | Hooper | 356/96 |
| 3,563,656 | 2/1971 | Helms | 356/96 |

Primary Examiner—Alfred E. Smith
Assistant Examiner—F. L. Evans

[57] ABSTRACT

A spectrophotometer sytem having a first stepper motor driving a wavelength scanning mechanism and a second stepper motor driving a chart recorder, both motors being operative in response to pulses from a system clock. The clock frequency is successively divided by first and second cascaded, switch-selectable sets of frequency dividers. The output of the first divider is applied to the wavelength motor and determines wavelength scan speed. The output of the second divider is applied to the chart motor and determines chart scale expansion. A decoder monitors the frequency selections of the first and second sets of frequency dividers, and upon detection of a frequency selection outside the capability of the chart motor, the decoder provides an output which inhibits the chart motor. When a first frequency selection is made, the available (i.e. valid) second frequency selections are displayed to the operator.

9 Claims, 6 Drawing Figures

| SCAN SPEED \ SCALE X | 20 X | 10 X | 4 X | 2 X | 1 X | 0.4 X |
|---|---|---|---|---|---|---|
| 1200 | NO | NO | NO | — — | — — | — — |
| 600 | NO | NO | — — | — — | — — | — — |
| 300 | NO | — — | — — | — — | — — | — — |
| 150 | — — | — — | — — | — — | — — | — — |
| 50 | — — | — — | — — | — — | — — | — — |
| 20 | — — | — — | — — | — — | — — | — — |
| 5 | — — | — — | — — | — — | — — | — — |
| 2 | — — | — — | — — | — — | — — | — — |

APPARATUS FOR MONITORING THE SELECTION OF CHART RECORDING AND WAVELENGTH SCANNING SPEEDS IN A RADIANT ENERGY ANALYZER

BACKGROUND OF THE INVENTION

This invention relates to radiant energy analyzers having chart recording means, and more particularly to an analyzer, such as a spectrophotometer, having a first plurality of preselectable wavelength scan speeds and a second plurality of preselectable chart expansion values.

In spectrophotometer systems a wavelength scanning device is utilized to transmit radiant energy of differing wavelengths through a sample to measure an optical characteristic of the sample (e.g. absorbance or transmittance), this characteristic then being recorded in graphical form on a chart recorder as a plot of optical characteristic (ordinate) vs. wavenumber or wavelength (abscissa). In such systems the wavelength scanning device is driven by a motor at one of a plurality of predetermined speeds. The abscissa of the chart paper is likewise controlled by a drive motor which may drive either the chart paper with respect to a marker or pen or vice versa, at one of a plurality of predetermined speeds to effect abscissa scale chart expansion. In this manner an operator may selectively expand the abscissa scale to provide greater clarity in regions of interest where the spectrum may be crowded or, alternatively, may reduce the abscissa scale for uncrowded regions of the spectrum.

To provide the greatest flexibility in an instrument of this type the operator should be given a wide selection of wavelength scanning speeds and a wide selection of abscissa scale chart expansions. Unfortunately, some of the selected combinations of scan speed and chart expansion may be limited by the capability of the drive motors or may be otherwise unusable by the system. A selected combination which exceeds the torque vs. speed capability of the chart motor, for example, could not be accurately executed by the motor, and the resulting graphical plot for such a selection would be erroneous.

SUMMARY OF THE INVENTION

Accordingly, it is an object of this invention to provide a new and improved radiant energy analyzer having a wide range of preselectable wavelength scanning speeds and chart scale expansion values.

It is another object of the invention to provide a radiant energy analyzer having means for detecting invalid combinations of wavelength scanning speed and chart scale expansion.

It is a further object of the invention to provide means for inhibiting operation of the chart drive for invalid combinations of scanning speed and scale expansion.

It is a still further object of the invention to provide means for indicating to an operator after selecting one of scan speed or chart drive the valid selections available for the other.

The foregoing and other objects of the invention are accomplished by providing a radiant energy analyzer having a first frequency responsive motor driving a wavelength scanning device and a second frequency responsive motor driving one of recorder chart paper and marker along the abscissa of the chart paper, with both said motors being operated from a system clock. First and second sets of cascaded, switch-selectable frequency dividers successively divide the system clock frequency and supply their respective outputs to the wavelength motor and the chart motor. Wavelength scan speed and chart expansion, respectively, are set by switch selection of the first and second sets of frequency dividers. A decoder monitors the combinations of selections from the first and second sets of dividers and, for invalid combinations, inhibits the second drive motor thereby preventing recording along the chart abscissa to preclude a an erroneous graphical plot.

Operator switch selection is simplified by means responsive to a first switch selection for ascertaining the corresponding valid second switch selections and for indicating the valid selections to an operator.

Other objects and advantages of the invention will be apparent from the following description taken in conjunction with the accompanying drawings.

DESCRIPTION OF THE PREFERRED EMBODIMENT

Figure 1:
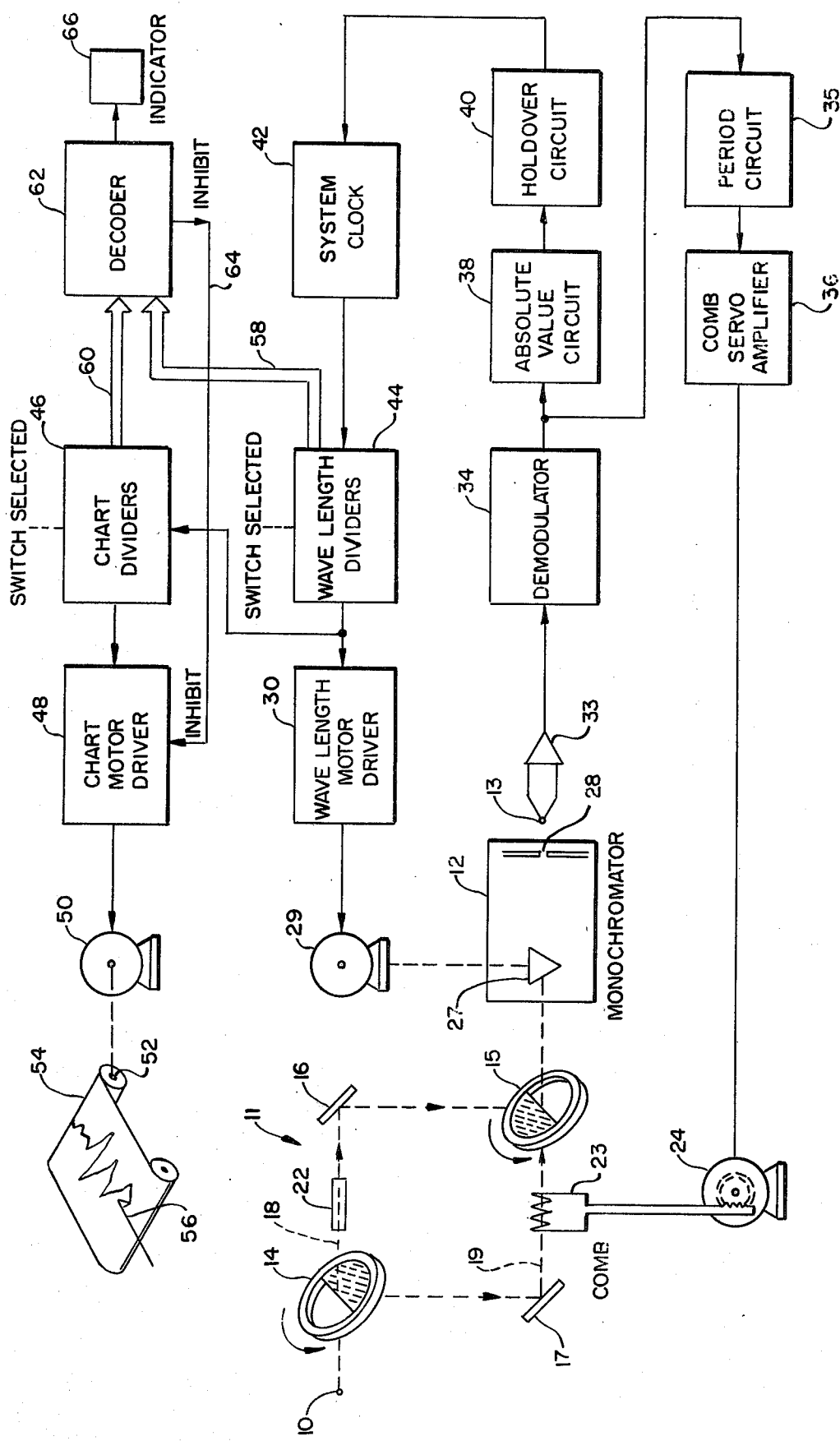
FIG. 1 is a block diagram of a spectrophotometer system according to the invention.

Referring now to the drawing and particularly to FIG. 1, a spectrophotometer system is illustrated which includes a source 10, a beam switching system 11, a monochromator 12 and a thermocouple 13. The source 10 may be any suitable device which produces radiation over the spectrum being analyzed. The beam switching system 11 includes half mirrors 14, 15 which are rotated in synchronism, and reflecting mirrors 16, 17, providing a sample beam path 18 and a reference beam path 19. A sample cell 22 is positioned in the sample beam path 18 for containing the sample to be analyzed. Means for varying the intensity of the beam along the reference beam path 19 is positioned therein. A typical example is comb 23 which is driven into and out of the reference beam path by a motor 24.

Monochromator 12 includes means for dispersing the beam passing therethrough, shown here as prism 27, and slit 28 which permits only a small fraction of the dispersed beam to impinge on thermocouple 13. Prism 27 is rotated by a scan motor 29 during the analysis to scan the entire spectrum of interest past the slit 28. Scan motor 29, as employed in this embodiment, is a frequency responsive motor such as a stepper motor which is rotated by means of discrete digital pulses, and has a speed dependent upon the frequency of the pulses. Motor 29 is energized from a wavelength motor driver 30 which is ordinarily set to operate the motor at a constant rate. A programmed change in scan speed over the spectrum is usually desired and is conventionally accomplished by coupling the motor to the prism or other dispersing element by means of a cam of appropriate contour.

Thermocouple 13 produces an electrical error signal proportional to the difference in intensity of the beams traversing the sample path and reference path with the error signal cyclically varying at the beam switching rate, which ordinarily is in the range of 5 to 20 cycles per second. The error signal from thermocouple 13 is connected to an amplifier 36. The output of the amplifier 36 drives the comb motor 24, with the amplifier and motor functioning as the comb servo.

Demodulator 34 is operated in synchronism with the beam switching system and converts the a.c. error signal to d.c. Various types of demodulators may be used with a mechanical chopper preferred at the relatively low frequencies ordinarily encountered in such instruments. Period circuit 35 is a low pass filter that limits the response rate of the comb servo and reduces the sensitivity of the instrument to sharp transients in the error signal such as are ordinarily produced by noise. The time constant of the period circuit is selected as a compromise between the maximum response rate of the comb servo and the acceptable noise level and typically is in the range of ¼ to 16 seconds. The simplest form of period circuit which is used in many instruments is a resistance capacitance filter section comprising a series resistor and a shunt capacitor.

Scan speed suppression is provided by utilizing an absolute value circuit 38 which produces a voltage whose magnitude is determined by the absolute value of the error signal. This output is then transmitted to a hold-over circuit 40, the output of which controls the voltage controlled oscillator or system clock 42. The output of the system clock 42 is a pulse train, the frequency of which is proportional to the absolute value of the error signal. This output frequency is then divided by switch-selectable wavelength dividers 44 to produce a pulse train at a suitable frequency for the selected scan speed for application to the wavelength motor driver 30 which drives wavelength stepper motor 29. The pulse train output of dividers 44 is also applied to switch-selectable chart dividers 46 which are connected in cascade with dividers 44. The output pulse train from chart dividers 46, at a suitable frequency for the selected chart expansion, is applied to the chart motor driver which, in turn, drives a chart stepper motor 50. The chart stepper motor 50 in turn drives a take-up reel 52 of chart paper 54 having the sample spectrum graphically reproduced thereon by a suitable marker or pen 56, the pen position on the graph ordinate being indicative of the optical characteristic of the sample 22 and the chart movement along the graph abscissa being indicative of wavelength or wavenumber.

In accordance with the present invention, the wavelength dividers 44 and the chart dividers 46 are monitored by means of a decoder 62 connected to the dividers by respective cables 58 and 60. Decoder 62, as will hereinafter be discussed, monitors for invalid combinations of selections of wavelength dividing frequency and chart dividing frequency. Upon occurrence of an invalid combination, decoder 62 prevents recording of inaccurate information by directing an inhibit signal on cable 64 to the chart motor driver 48 to inhibit operation of chart motor 50 and thus inhibit the drive of chart 54. In another aspect of the invention, decoder 62 controls a display or indicating system 66 which aids operator control panel set up of frequency selections by indicating to the operator the valid selections available in one set of dividers 44 or 46 after selecting one divider in the other set of dividers.

Figure 2:
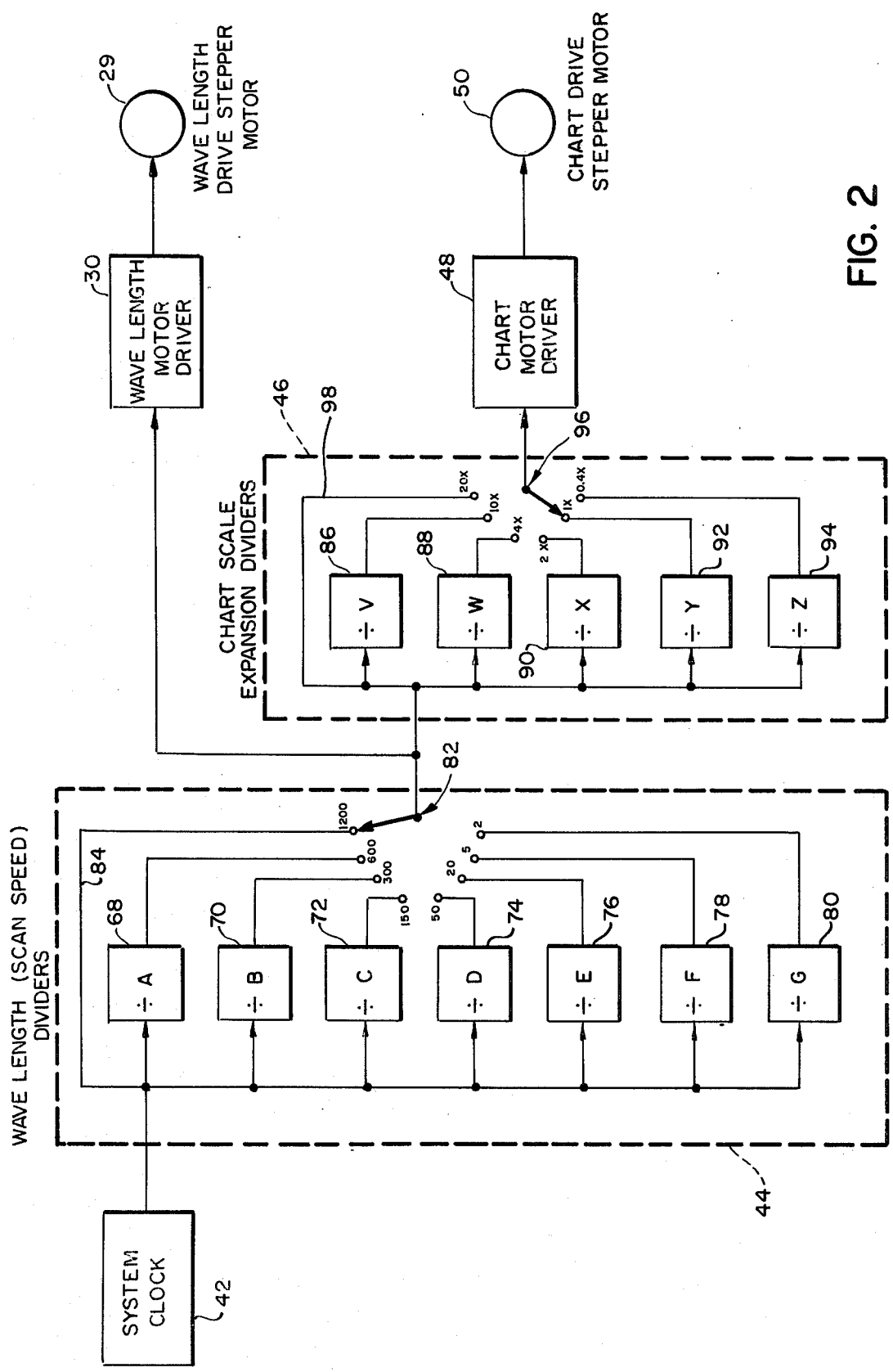
FIG. 2 is a block diagram of a portion of the system of FIG. 1 showing the wavelength scan speed dividers and chart scale expansion dividers.

Referring now to FIG. 2, the system clock 42 provides a train of pulses output to wavelength dividers 44 comprising a first plurality or set of switch-selectable frequency dividers 68, 70, 72, 74, 76, 78 and 80, any one of which can be placed in series with the output of the system clock 42 by means of rotary switch 82. Additionally, the system clock 42 output can be transferred directly over lead 84 to one terminal of rotary switch 82, this terminal being designated "1,200" (1,200 wavenumbers per minute). The remaining terminals are designated "600" for frequency divider 68, "300" for frequency divider 70, "150" for frequency divider 72, etc. The frequency dividing values "A", "B", etc., are predetermined frequency dividing values to provide the selected scan speed designated by the appropriate contact of rotary switch 82. The output transferred through rotary switch 82 then passes to the chart dividers 46 comprising a second set of frequency dividers (the division factors being designated V, W, X, Y and Z) 86, 88, 90, 92 and 94, any one of which is switch selectable by means of rotary switch 96 to place one of the frequency dividers in series between rotary switch 82 and chart motor driver 48. Additionally, a bypass lead 98 is provided to transfer the output of wavelength dividers 44 directly to the chart motor driver 48 with switch 96 at the "20X" position. The switch contacts are designated 0.4X, 1X, 2X, 4X, 10X and 20X to indicate the abscissa scale chart expansion selections.

With the switches 82 and 96 in the positions illustrated, the output of system clock 42 is transferred over lead 84 through switch 82 to wavelength motor driver 30 to drive wavelength motor 29 and through frequency divider 92 to the chart motor driver 48 to drive the chart motor 50. It is to be understood that although rotary switches 82 and 96 are shown, mutually exclusive push-button switches can also be utilized, with one switch for each of the designated variables or parameters as illustrated and described subsequently with regard to FIG. 6.

Figures 3, 4:
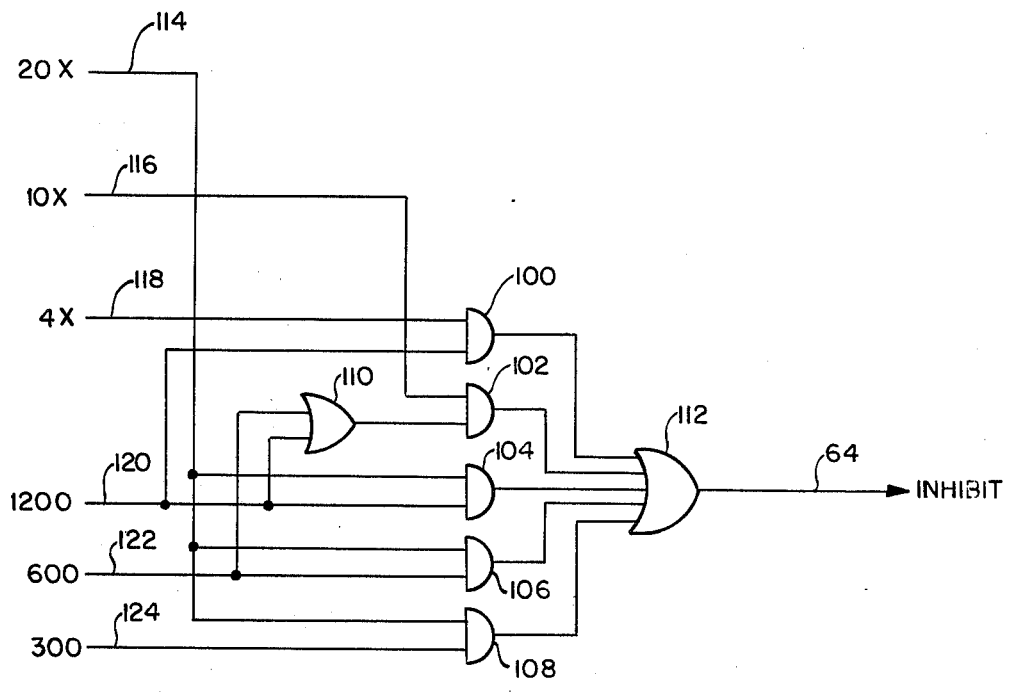
FIG. 3 shows in tabular form combinations of scale expansion and wavelength scan speed identified as valid or invalid combinations.
FIG. 4 is a logic diagram of a portion of the decoder used in the system of FIG. 1.

Referring now to the table of FIG. 3, the vertical axis represents wavelength scan speed in wavenumbers per minute selected by switch 82, while the horizontal axis represents scale expansion values selected by switch 96. Each possible combination of selected scan speed and scale expansion is designated "--" if it is a permissible or valid combination or is designated "NO" if it is an impermissible or invalid combination, the invalid combinations being determined by design constraints of the motors being utilized (e.g. torque vs. speed characteristics) or other factors rendering a given combination unusable. In the instant embodiment scan speeds of 1,200, 600 or 300 with a 20X chart scale expansion are invalid selections. Similarly, scan speeds of 1,200 or 600 with a scale expansion of 10X are invalid as is a scan speed of 1,200 with a scale expansion of 4X.

Referring now to FIG. 4, a logic diagram of a portion of decoder 62 is shown and includes AND gates 100, 102, 104, 106 and 108 as well as OR gates 110 and 112.

The logic diagram accomplishes the result shown in tabular form in FIG. 3 to provide an "inhibit" signal at the output of OR gate 112 in the event the conditions labeled "NO" exist.

The inputs to the logic diagram of FIG. 4 are only those inputs of interest and relate to the chart scale expansion multipliers 20X on lead 114, 10X on lead 116 and 4X on lead 118 as well as the scan speed settings of 1,200 on lead 120, 600 on lead 122 and 300 on lead 124. In the event the operator selects the 20X scale expansion with the 1,200 scan speed, leads 114 and 120 go "high", these two inputs being provided to AND gate 104 to pass through OR gate 112 to provide an output thus inhibiting the chart drive motor 50. Similarly, if the operator selects 10X scale expansion with either the 1,200 or 600 scan speeds, AND gate 102 is enabled from lead 116 as well as from the OR gate 110 which is coupled to lead 120 and 122. Similarly, with a scale expansion selection of 4X lead 118 is "high" and with a scan speed of 1,200 lead 120 is "high", thereby enabling AND gate 100 which provides a signal through OR gate 112 to provide the output. AND gate 106 is enabled with a scan speed of 600 and a scale expansion of 20X while AND gate 108 is enabled with the same scale expansion at a scan speed of 300. In any event, the logic diagram of FIG. 4 effectively provides an output through OR gate 112 for the invalid combinations of FIG. 3.

Figure 6:
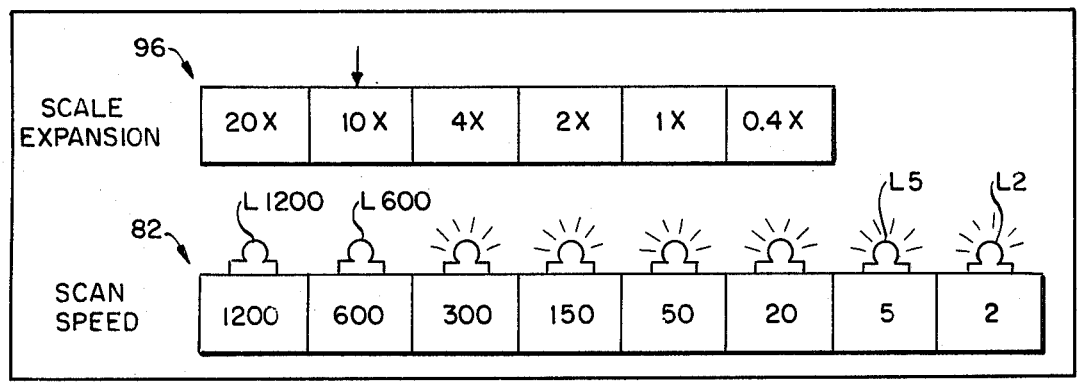
FIG. 6 is a diagramatic representation of the scale expansion and scan speed switches of FIG. 2 (in pushbutton form) and illustrates for the selection of one scale expansion value, the illumination of the corresponding valid scan speed selections by the display circuit of FIG. 5.

The decoder 62 further controls display system 66 (FIG. 1) to aid the operator in selecting various combinations of scan speed and scale expansion. In this regard, FIG. 6 illustrates diagramatically a portion of the control panel containing switch 82 for selecting scan speed and switch 96 for selecting scale expansion. The switches are illustrated in push-button form and are labeled with the scan speed and scale expansion values shown in FIGS. 2 and 3. A plurality of indicating lamps L are associated, one each, with the scan speed push-buttons. Thus lamp L2 is shown disposed adjacent scan speed push-button 2, lamp L5 is adjacent push-button 5, and so forth. When the operator initially selects a scale expansion value by depressing the appropriate scale expansion push-button, decoder 62 operates to illuminate only those of lamps L which respresent valid scan speed selections. For example, if scale expansion value 10X is selected (as indicated by the arrow over the 10X push-button in FIG. 6), the lamps L300 through L2 associated with valid scan speed push-button 300 through 2 are illuminated, while the remaining lamps L600 and L1200 associated with invalid scan speed selections are extinguished. As a result, by displaying the valid available selections to the operator, the possibility of selecting an invalid combination is substantially reduced.

Figure 5:
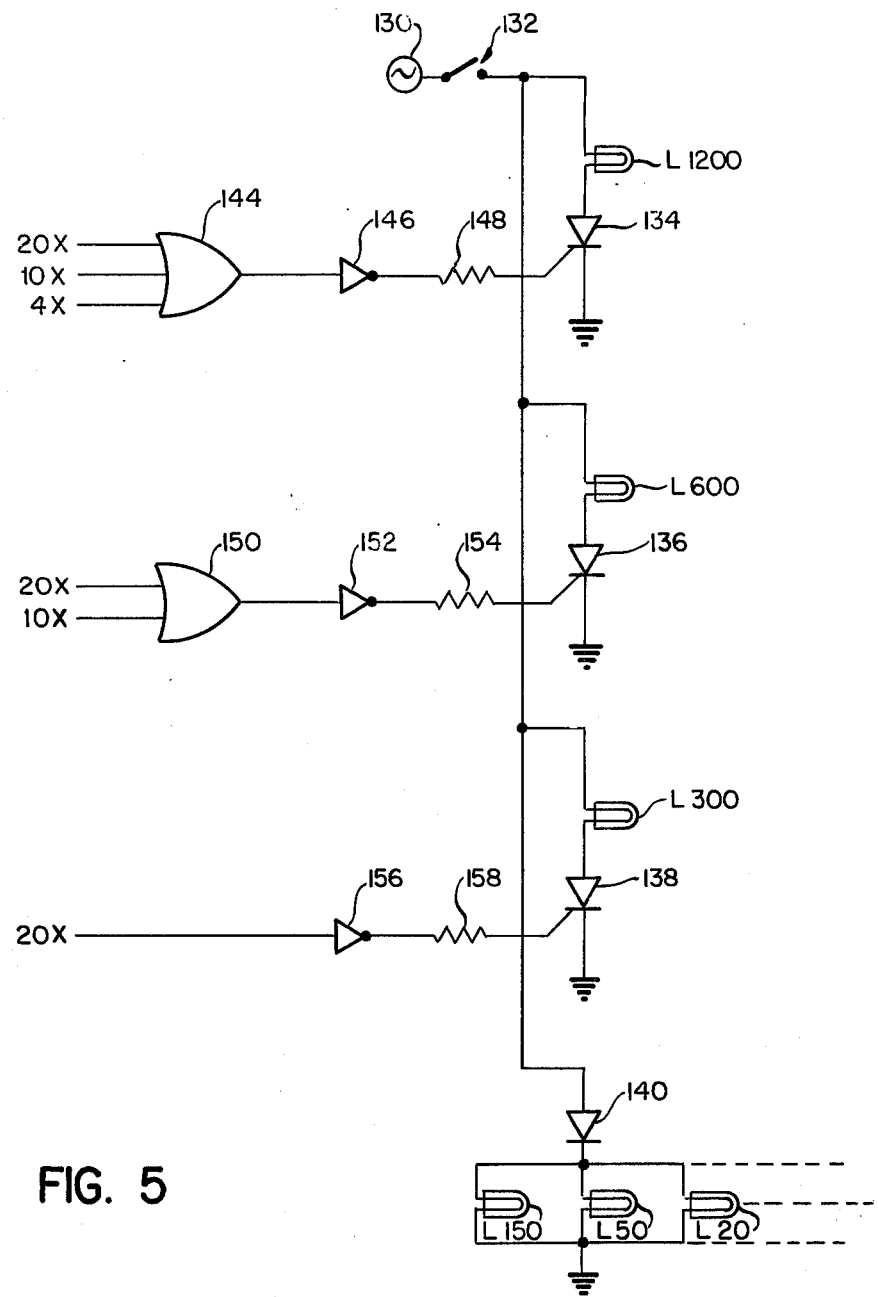
FIG. 5 is a schematic of a lamp display circuit controlled by the decoder of FIG. 1 for illuminating valid scan speed selection switches after selection of a given scale expansion value.

Indicator lamps L are controlled by the circuit of FIG. 5 which includes alternating voltage source 130 connected to each of the lamps L through switch 132. The lamps L1200, L600, and L300 are connected in series with respective silicon controlled rectifiers (SCR's) 134, 136, and 138 which control current flow through the lamps and thus the illumination of the lamps. The remaining lamps L150 through L2 are connected to the voltage source through diode 140. The gate circuit of SCR 134 includes OR gate 144 having its output connected through inverter 146 and resistor 148 to the SCR gate electrode. OR gate 144 has three inputs identified as scale expansion values 20X, 10X and 4X. Similarly, the gate circuit of SCR 136 includes OR gate 150, inverter 152, and resistor 154 with OR gate inputs 20X and 10X. The gate circuit of SCR 138 comprises a 20X scale expansion input applied through inverter 156 and resistor 158 to the SCR gate electrode.

The SCR's 136–138 are nonconductive with a "low" input on their gate electrodes and are conductive with a "high" input on the gate electrode. When switch 132 is closed, voltage is applied to each of the lamps L. Lamps L150 through L2 are immediately illuminated since they are associated with scan speed selections which are always valid. Lamps L1200, L600 and L300, however, are only illuminated if the corresponding SCR thereof is turned on. Prior to selecting a scale expansion value, the scale expansion inputs 20X, 10X and 4X in FIG. 5 are "low". Thus, the input to inverters 146, 152 and 156, is "low" and the corresponding inverter outputs are "high". The "high" voltage level supplied from the inverters through respective resistors 148, 154, 158, to each SCR gate electrode renders the SCR's conductive.

When a scale expansion value is selected by actuating the desired scale expansion push-button, the corresponding scale expansion input in FIG. 5 goes "high". For example, if the 4X scale expansion push-button is pressed, the 4X input goes "high". Therefore, the output of OR gate 144 will go "high" and the output of inverter 146 "low" which will turn off SCR 134 and extinguish lamp L1200. The remaining lamps will remain lit since they represent valid scan speed selections for the 4X chart expansion. Similarly, if the 10X chart expansion value is selected, SCR's 134 and 136 are rendered nonconductive to extinguish lamps L1200 and L600. In a similar manner, selection of the 20X chart expansion value renders SCR's 134, 136 and 138 nonconductive to extinguish lamps L1200, L600, and L300.

If any of the non-illuminated, invalid scale expansion push-buttons is selected, the decoder 62 provides an inhibit signal over inhibit line 64 to inhibit the chart motor 50 as previously described. Illuminating the valid push-button selections facilitates operator selection of valid scan speed and chart expansion combinations. However, in the event that an invalid selection is made, the recording of erroneous data on chart 54 is precluded by inhibiting the chart drive motor 50.

In the preferred embodiment, lamps L illuminate valid scan speed selection switch positions in response to a given chart expansion selection. If desired, the lamps could readily be arranged to illuminate the chart expansion selections in response to selection of a given scan speed. While AND-OR logic has been illustrated in the preferred embodiment, it should be understood that NAND-NOR or other logic arrangements could be employed in the invention. Moreover, it will be apparent that while particular forms of the invention have been illustrated and described, various modifications can be made therein without departing from the spirit and scope of the invention. Accordingly it is not intended that the invention be limited except as by the appended claims.

I claim:

1. In a radiant energy analyzer having a radiation source, a monochromator and a wavelength scanning mechanism therefor, and chart recording means for moving a marker in relation to chart paper along an abscissa scale and ordinate scale for recording a waveform spectrum of a sample, the combination comprising:
- a system clock having an output of a predetermined frequency;
- a first frequency responsive drive motor for driving said wavelength scanning mechanism for continuously varying the wavelength output of said monochromator at various wavelength scan speeds;
- a second frequency responsive drive motor in said chart recording means for driving one of said marker and chart paper along the abscissa with respect to the other of said marker and said chart paper;
- a first set of frequency dividers switch selectable to place a frequency divider thereof in series between said system clock output and said first drive motor, said first set of frequency dividers having predetermined frequency dividing values for wavelength scan speed selection;
- a second set of frequency dividers switch selectable to place a frequency divider thereof in series between said first set of frequency dividers and said second drive motor, said second set of frequency dividers having predetermined frequency dividing values for abscissa scale expansion selection; and
- decoding means coupled to said first and second sets of frequency dividers for providing an output in response to invalid combinations of selected dividers of said sets.

2. The combination of claim 1 including means connected between said decoding means and said second drive motor for inhibiting said second drive motor in response to the output of said decoding means.

3. The combination according to claim 1 wherein said first and second drive motors are stepper motors and said system clock has a train of pulses output.

4. In a radiant energy analyzer having a radiant source, a monochromator and a wavelength scanning mechanism therefor, and chart recording means for moving a marker in relation to chart paper along an abscissa scale and ordinate scale for recording a waveform spectrum of a sample, the combination comprising:
- a system clock having an output of a predetermined frequency;
- a first frequency responsive drive motor for driving said wavelength scanning mechanism for continuously varying the wavelength output of said monochromator at various wavelength scan speeds;
- a second frequency responsive drive motor in said chart recording means for driving one of said marker and chart paper along the abscissa with respect to the other of said marker and said chart paper;
- a first set of frequency dividers switch selectable to place a frequency divider thereof in series between said system clock output and said first drive motor, said first set of frequency dividers having predetermined frequency dividing values for wavelength scan speed selection;
- a second set of frequency dividers switch selectable to place a frequency divider thereof in series between said first set of frequency dividers and said second drive motor, said second set of frequency dividers having predetermined frequency dividing values for abscissa scale expansion selection; and
- decoding means coupled to said first and second sets of frequency dividers and responsive to the selection of a divider in one of said sets for ascertaining the validly selectable dividers in the other of said sets and for generating an output representative thereof.

5. The combination according to claim 4 including indicating means responsive to said output of said decoding means for informing an operator of said validly selectable dividers.

6. The combination according to claim 5 wherein said sets of frequency dividers include frequency divider selection switches and said indicating means includes means for illuminating the switch positions corresponding to said validly selectable dividers.

7. The combination according to claim 6 wherein said decoding means is operative in response to invalid combinations of selected dividers from said first and second sets of dividers to provide a further output in response thereto, and said combination includes means applying said further output to inhibit said second drive motor.

8. In a radiant energy analyzer having a radiation source, a monochromator and a wavelength scanning mechanism therefor, and chart recording means for moving a marker in relation to chart paper along an abscissa scale and ordinate scale for recording a waveform spectrum of a sample, the combination comprising:
- a system clock having an output of a predetermined frequency;
- a first frequency responsive drive motor for driving said wavelength scanning mechanism for continuously varying the wavelength output of said monochromator at various wavelength scan speeds;
- a second frequency responsive drive motor in said chart recording means for driving one of said marker and chart paper along the abscissa with respect to the other of said marker and said chart paper;
- first frequency division means connected between said system clock output and said first drive motor and selectable to provide a plurality of frequency division values for wavelength scan speed selection;
- second frequency division means connected between said first frequency division means and said second drive motor and selectable to provide a plurality of frequency division values for abscissa scale expansion selection; and
- decoding means for monitoring the selection of frequencies of said first and said second frequency division means and for providing an output in response to invalid combinations of frequency selections.

9. The combination of claim 8 including means connected between said decoding means and said second drive motor for inhibiting said second drive motor in response to the output of said decoding means.

* * * * *